United States Patent [19]
Lombarbi

[11] Patent Number: 5,267,699
[45] Date of Patent: Dec. 7, 1993

[54] METHODS OF WINDING ARMATURES WITH MODIFIED SIDE PATTERN

[75] Inventor: Massimo Lombarbi, Florence, Italy

[73] Assignee: Axis USA, Inc., Marlborough, Mass.

[21] Appl. No.: 850,957

[22] Filed: Mar. 11, 1992

[51] Int. Cl.⁵ .......................................... H02K 15/09
[52] U.S. Cl. .............................. 242/7.03; 242/7.05 B; 29/598; 310/234
[58] Field of Search .................. 242/7.05 C, 7.05 R, 242/7.05 B, 7.05 A, 7.03, 7.11, 7.09; 29/597, 598, 735; 310/234, 198

[56] References Cited

U.S. PATENT DOCUMENTS

| | | |
|---|---|---|
| 3,191,269 | 6/1965 | Moore . |
| 3,448,311 | 6/1969 | Mommsen et al. . |
| 3,628,229 | 12/1971 | Biddison ............... 242/7.05 B X |
| 3,913,220 | 10/1975 | Miller . |
| 3,972,843 | 12/1975 | Dammar . |
| 5,172,870 | 12/1992 | Van Assema ........... 242/7.05 B X |

Primary Examiner—Andrew M. Falik
Attorney, Agent, or Firm—Robert R. Jackson

[57] ABSTRACT

A method of winding coils on an armature in which the start and finish leads for the first coils to be wound are wrapped around the armature shaft between the armature core and commutator so that these leads are supported by the shaft and are largely out of the way when the later coils are wound. The start and finish leads for the later coils are not wrapped around the armature shaft, but rather run more directly to the commutator as in conventional side pattern winding.

7 Claims, 7 Drawing Sheets

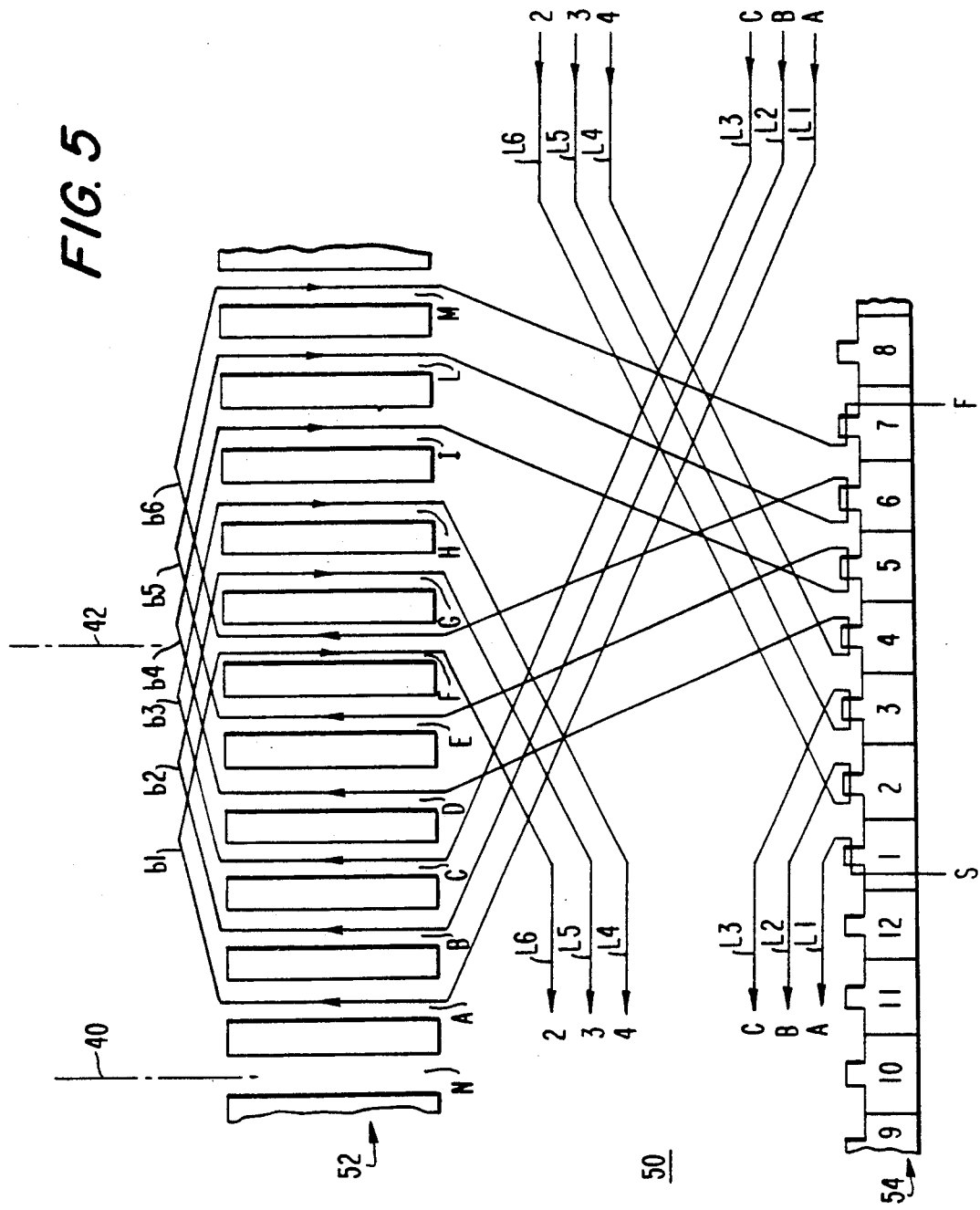

METHODS OF WINDING ARMATURES WITH MODIFIED SIDE PATTERN

BACKGROUND OF THE INVENTION

This invention relates to methods of winding electric motor armatures, and more particularly to methods of winding armatures with a modified side pattern.

Various schemes for winding electric motor armatures are known as shown, for example, in Mommsen et al. U.S. Pat. No. 3,448,311, Miller U.S. Pat. No. 3,913,220, and Dammar U.S. Pat. No. 3,927,843. Despite the existence of alternative winding schemes such as are shown in these references, the so-called "side" pattern remains popular for certain applications such as low voltage, high current electric motors used in automobiles.

FIG. 1 shows side pattern coils wound on an armature 50 by one flyer 84 or 87 in a dual flyer winding machine 80 (see FIG. 3). FIG. 2 shows the similar coils simultaneously wound on the same armature by the other flyer of the winder. (In all of the drawings like FIGS. 1 and 2 the coils are simplified for greater clarity by omitting the leg of each coil which is closest to commutator 54.) Considering FIG. 1 initially, coil winding by the first flyer begins by passing the wire from that flyer through the tang on commutator member 1. Then the wire is alternately passed through armature slots A and F until the desired number of turns has been produced in coil b1. Thereafter, from slot F, the wire is drawn back to the tang on commutator member 2. From commutator tang 2 the wire is wound around slots B and G to produce coil b2, and then the wire is drawn back to commutator tang 3. This process continues until all of coils b1 through b6 have been wound one after another. Winding by the first flyer is concluded by passing the wire out through commutator tang 7.

At the same time that coil b1 is being wound, a similar coil b7 is being wound by the other flyer on the diametrically opposite side of the armature as shown in FIG. 2. The wire for coil b7 starts at commutator tang 7 and is wound through slots G and N. After coil b7 has been wound, the wire returns to commutator tang 8, from which the wire is subsequently drawn around slots H and A to produce coil b8 concurrently with the winding of coil b2. Again this process continues until all of coils b7 through b12 have been wound, and winding by the second flyer is concluded by passing the finish lead from coil b12 out through commutator tang I.

In the conventional dual flyer winder 80 shown in FIG. 3 (see also the above mentioned Miller and Dammar patents) the relative motion between the wires and armature 50 required to wind the armature is produced by rotating the wire dispensing flyers about an axis 75 which is perpendicular to the longitudinal axis of the armature, and by rotating the armature about its longitudinal axis. To produce the pure side pattern shown in FIGS. 1 and 2 it is typically only necessary to rotate the armature one slot increment after each diametrically opposite pair of coils has been wound.

It will be noted that in the side pattern the start and finish leads of each coil run substantially directly to an armature tang which is on the same side of the armature as the coil and which is angularly between the slots on which the coil is wound. Because of this substantially direct routing, the start and finish leads are typically not in contact with the central armature shaft 56 which runs between the core and commutator regions 52 and 54 of the armature (see FIG. 4). One consequence of this is that, as winding proceeds, the later coils deposited by each flyer tend to bear on the leads of the coils deposited earlier by the other flyer. As shown in FIGS. 1 and 2, for example, coils b10, b11, and b12 wound by the second flyer bear on leads L1, L2, and L3 formed by the first flyer. Similarly, coils b4, b5, and b6 wound by the first flyer bear on leads LR1, LR2, and LR3 formed by the second flyer. The coils which thus bear on the leads of other coils tend to be forced radially farther out than previously wound coils. This causes nonuniform distribution of mass around the armature, which can make the armature more difficult to balance.

Another disadvantage of the above-described winding pattern is that for armatures requiring a high slot fill with tight wire winding, the later-deposited coils can overstress and break the unsupported lead wires of the previously deposited coils on which the later coils bear.

Despite the foregoing drawbacks of the side pattern, that pattern continues to be favored for certain motors because it has several benefits as compared to the known alternatives such as those shown in the above-mentioned Miller patent. Among these benefits are shorter start and finish leads, less need for axial space between the core and commutator portions 52 and 54 of the armature (thereby allowing the armature to be made shorter), and more efficient air circulation for cooling the coil ends which are located between the core and commutator portions of the armature because of the space left open under the start and finish leads. This last advantage is especially important for low voltage, high current motors such as are used in automobiles, and of course applies only if the coils are not impregnated.

In view of the foregoing it is an object of this invention to provide methods for winding armatures with a modified side pattern which has at least some of the advantages of the conventional side pattern, while ameliorating the disadvantages of that conventional pattern.

SUMMARY OF THE INVENTION

This and other objects of the invention are accomplished in accordance with the principles of this invention by providing methods for winding armatures in which the first several coils are wound so that the start and finish leads of those coils are wrapped around the armature shaft between the core and commutator portions of the armature to an extent sufficient to cause those leads to contact and be supported by the armature shaft. Thereafter, the remaining coils are wound with start and finish leads which are unsupported by the armature shaft.

Further features of the invention, its nature and various advantages will be more apparent from the accompanying drawings and the following detailed description of the preferred embodiments.

BRIEF DESCRIPTION OF THE DRAWINGS

FIG. 5 is another view similar to FIG. 1 showing a portion of an illustrative embodiment of the modified side pattern of this invention.

DETAILED DESCRIPTION OF THE PREFERRED EMBODIMENTS

Figure 6:
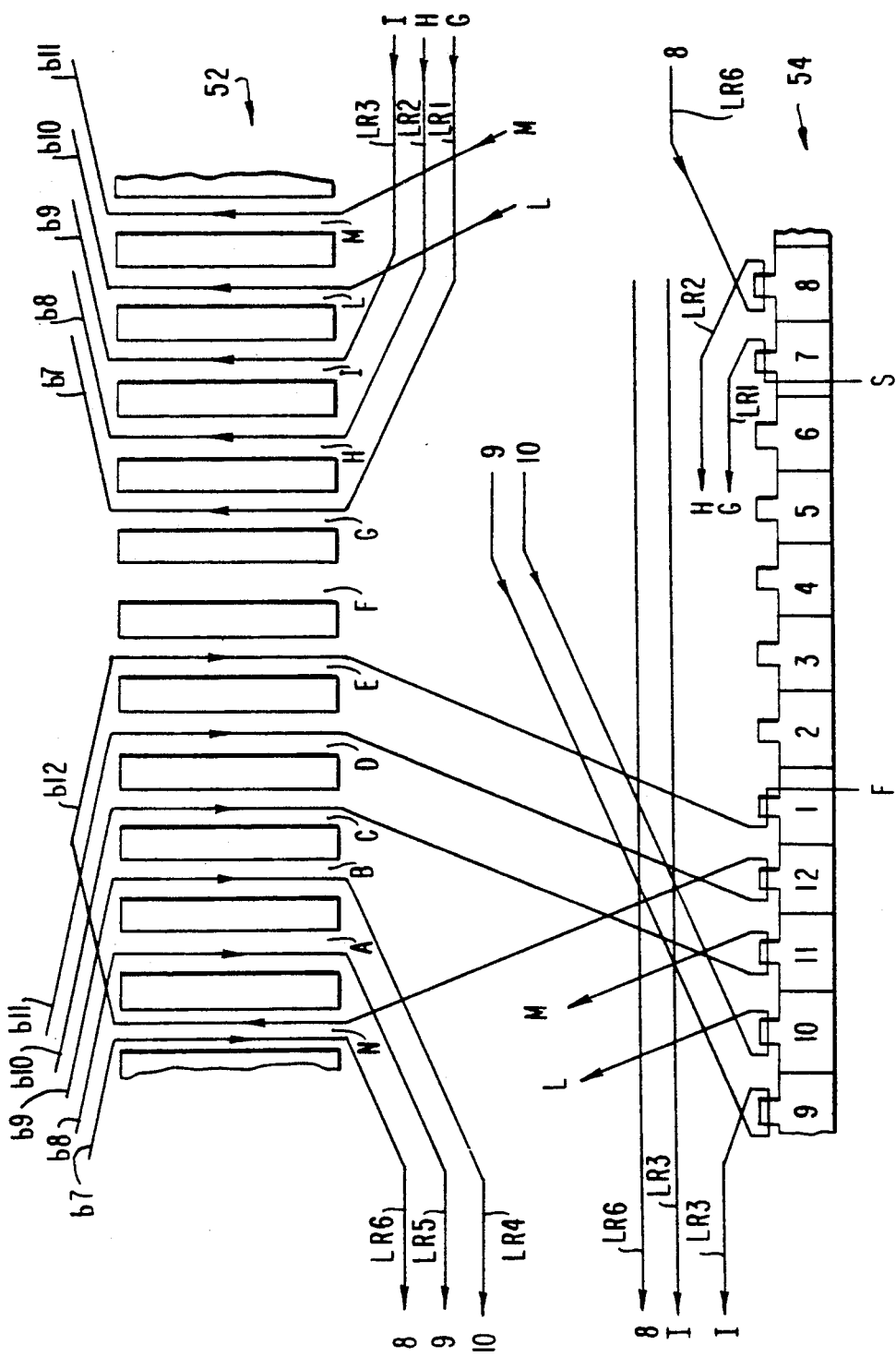
FIG. 6 is still another view similar to FIG. 1 showing another portion of the illustrative embodiment partly shown in FIG. 5.

An illustrative embodiment of modified side pattern armature winding in accordance with this invention is shown in FIGS. 5 and 6. If desired, this pattern can be produced by a conventional two-flyer winder as shown, for example, in FIG. 3, albeit with the requisite modification of the relative motion of the armature and wire dispensing flyers. FIG. 5 shows the windings produced by one flyer, while FIG. 6 shows the windings simultaneously produced by the other flyer.

Figure 7:
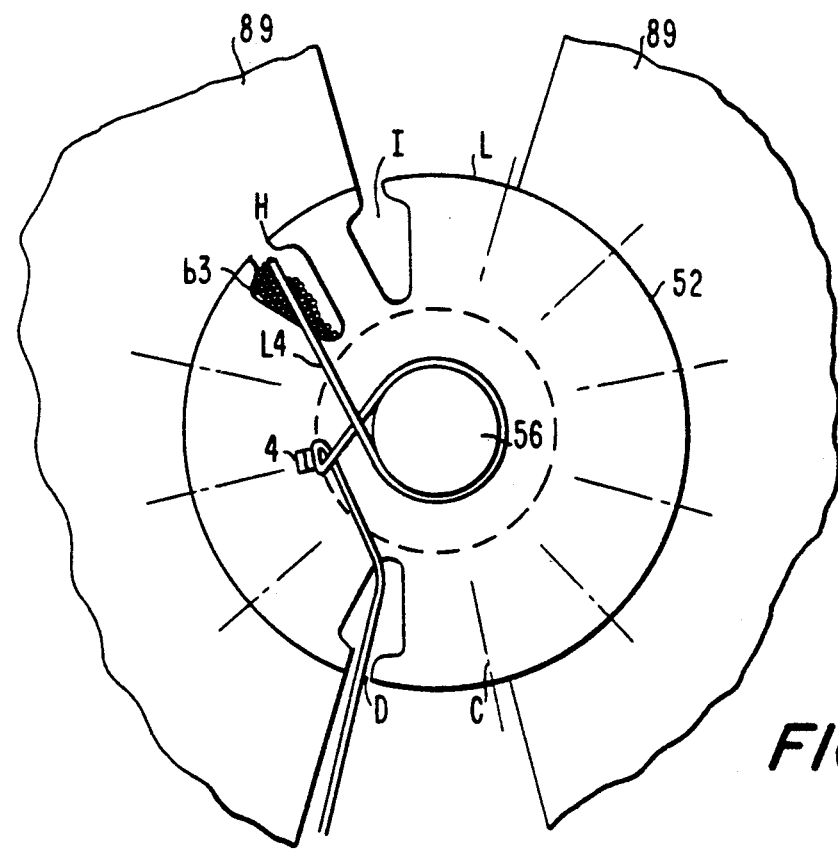
FIG. 7 is a simplified sectional view showing one stage of the winding of an armature in accordance with this invention.

Considering first the windings shown in FIG. 5, winding begins by passing a first coil start lead through commutator tang 1. Armature 50 is then rotated more than 360° about its longitudinal axis to wrap start lead L1 around armature shaft 56 before beginning to wind coil b1 around the chord of the armature which is bounded by slots A and F. Accordingly, start lead L1 contacts and is supported by shaft 56 between core portion 52 and commutator portion 54. When coil b1 is complete, armature 50 is again rotated more than 360° about its longitudinal axis to wrap finish lead L6 around shaft 56 before it reaches commutator tang 2. After the wire has passed through tang 2, armature 50 is again rotated more than 360° about its longitudinal axis to wrap the start lead L2 for the next coil around shaft 56 before beginning to wind coil b2 around the armature chord between slots B and G. The finish lead L5 of coil b2 is also wrapped around shaft 56 by a more than 360° rotation of the armature. Lead L5 then passes through commutator tang 3 and becomes the start lead L3 for the next coil b3. Start lead L3 is also wrapped around shaft 56 by a more than 360° rotation of the armature, and the finish lead L4 of coil b3 is similarly wrapped around shaft 56 by another more than 360° rotation of the armature. Three coils (b1, b2, and b3) have now been wound, each with start and finish leads which contact and are supported by shaft 56 by virtue of having been wrapped around the shaft. For example, FIG. 7 shows how the finish lead L4 of coil b3 is wrapped more than 360° around shaft 56 on its way from slot H to commutator tang 4. (When it is said herein and in the appended claims that a lead wire contacts and/or is supported by the armature shaft, it will be understood that this contact and/or support may be either direct or wholly or partly indirect (e.g., via contact with other lead wires previously wrapped around the shaft).)

At the same time that one flyer is winding coils b1 through b3 as described above, the other flyer is winding similar coils b7 through b9 on the opposite side of the armature as shown in FIG. 6. The start and finish leads LR1 through LR6 of coils b7 through b9 are all wrapped more than 360° around shaft 56 on their way to and from tangs 7–9 in the same way that leads L1 through L6 are wrapped more than 360° around that shaft. Accordingly, all of leads LR1 through LR6 contact and are supported by shaft 56.

Returning to FIG. 5, after coil b3 has been wound and its finish lead L4 passed through tang 4, the winding process switches to more conventional side pattern winding for remaining coils b4 through b6. In particular, after finish lead L4 is wrapped around shaft 56 as described above, slots D and I are typically positioned as shown in FIG. 7 to receive wire from the flyer associated with the left hand wire guide or shroud 89. The side pattern winding of coil b4 in slots D and I can therefore begin immediately with the wire coming from tang 4 without substantial further rotation of the armature. When coil b4 has been wound, the finish lead from that coil is passed through tang 5 and the armature is indexed by the angular spacing between adjacent slots to position the armature for the side pattern winding of coil b5. After coil b5 has been wound, the finish lead from that coil is passed through tang 6 and the armature is indexed again to position it for the side pattern winding of coil b6. After coil b6 has been wound, the finish lead from that coil is passed out through tang 7. Because the armature is not rotated by any large amount during the side pattern winding of coils b4 through b6, the start and finish leads for these coils are not supported by armature shaft 56, and indeed these start and finish leads even tend to be spaced radially outward from leads L1 through L6 and LR1 through L6 which are wrapped around and supported by shaft 56.

At the same time that coils b4 through b6 are being wound, similar coils b10 through b12 are being wound by the other flyer on the opposite side of the armature as shown in FIG. 6. Again, the start and finish leads for coils b10 through b12 are not supported by shaft 56, but rather tend to be spaced radially outward from the shaft and the leads L1 through L6 and LR1 through LR6 which are wrapped around the shaft.

Among the advantages of the mixed winding pattern shown and described above is that the later-deposited coils do not bear as much on the start and finish leads for the coils deposited earlier. For example, as can be seen by comparing FIGS. 5 and 6, coils b10, b11, and b12 formed by the second flyer do not bear on the start leads L1, L2, and L3 of coils b1 through b3 formed by the first flyer. Similarly, coils b4, b5, and b6 wound by the first flyer do not bear on the start leads LR1 through LR3 of coils b7 through b9 formed by the second flyer. This allows the later-formed coils to be wound closer to armature shaft 56 so that they are more nearly like the preceding coils. This prevents excessive radial enlargement of the later coils, which can have such disadvantages as increasing the difficulty of balancing the armature, making it more difficult to achieve high slot fill, etc. On the other hand, the fact that the later coils are wound using the side pattern helps reduce the required length of the armature shaft between the core region 52 and the commutator region 54 of the armature, and also allows some air circulation to the ends of the coils adjacent the commutator if that is desired.

The description has been presented by applying the principles of the invention to an armature having twelve core slots, a coil pitch of 1:6, and one coil per slot, with consequent attachment to twelve commutator bars. The invention is equally advantageous for other types of armatures, i.e., armatures having a different number of core slots, more than one coil per slot, and/or a different number of commutator bars.

For the armature shown in FIGS. 5 and 6, the change from lead routing around the armature shaft is made after making four commutator connections. The choice as to when to make this change depends on various armature parameters such as slot pitch, size of the armature, number of coils per slot, diameter of the armature shaft, and the size of the winding wire. In order to make the best choice in this regard, it may be desirable to test several different choices in order to verify by visual inspection the quality of the resulting coils.

FIGS. 5 and 6 show routing of the leads of the first coils by more than 360° around the armature shaft. In particular, the angle of wrapping is approximately 360° plus the angle between two and half core slots. Smaller angles of wrapping may be used as long as the leads are supported by the armature shaft. Greater or smaller angles beyond the lines 40 and 42 (slot pitch) shown in FIG. 5 can cause inconvenience when changing to direct lead routing (shown from commutator bar 4 and commutator bar 10 in FIGS. 5 and 6). In particular, for angles beyond the range delimited by these lines, one of the leads going to or from a bar which is directly routed to the core will become excessively long.

Commutator members for obtaining lead connections according to the principles which have been illustrated in the foregoing are usually of the tang type. The leads can be connected to such tangs by well known alpha or omega connections.

FIGS. 5 and 6 show a particular progression to connect the leads to the commutator bars and to wind the coils in the slots. This progression has been combined with specific turning directions of the flyers. The invention is equally applicable to an opposite progression and also to different turning directions of the flyers.

A further advantage obtained by winding and lead connecting according to this invention is that the start leads which are wrapped around the armature do not loosen during the winding of the first coils. This avoids the need for extra equipment such as the gripper sleeve used in prior art machines to maintain the wire behind the commutator tangs of the first coils.

Figure 1:
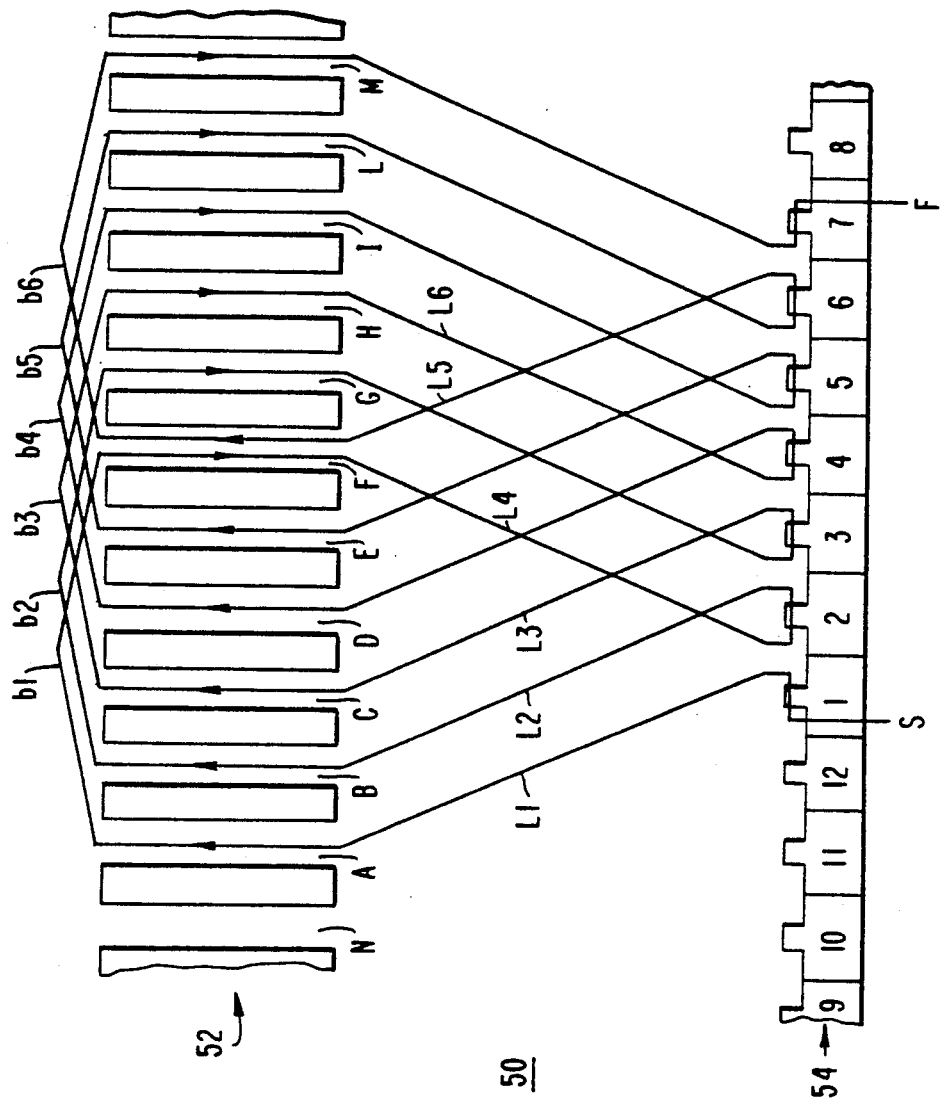
FIG. 1 is a simplified planar projection of an illustrative armature showing the conventional side pattern winding of that armature.
Figure 2:
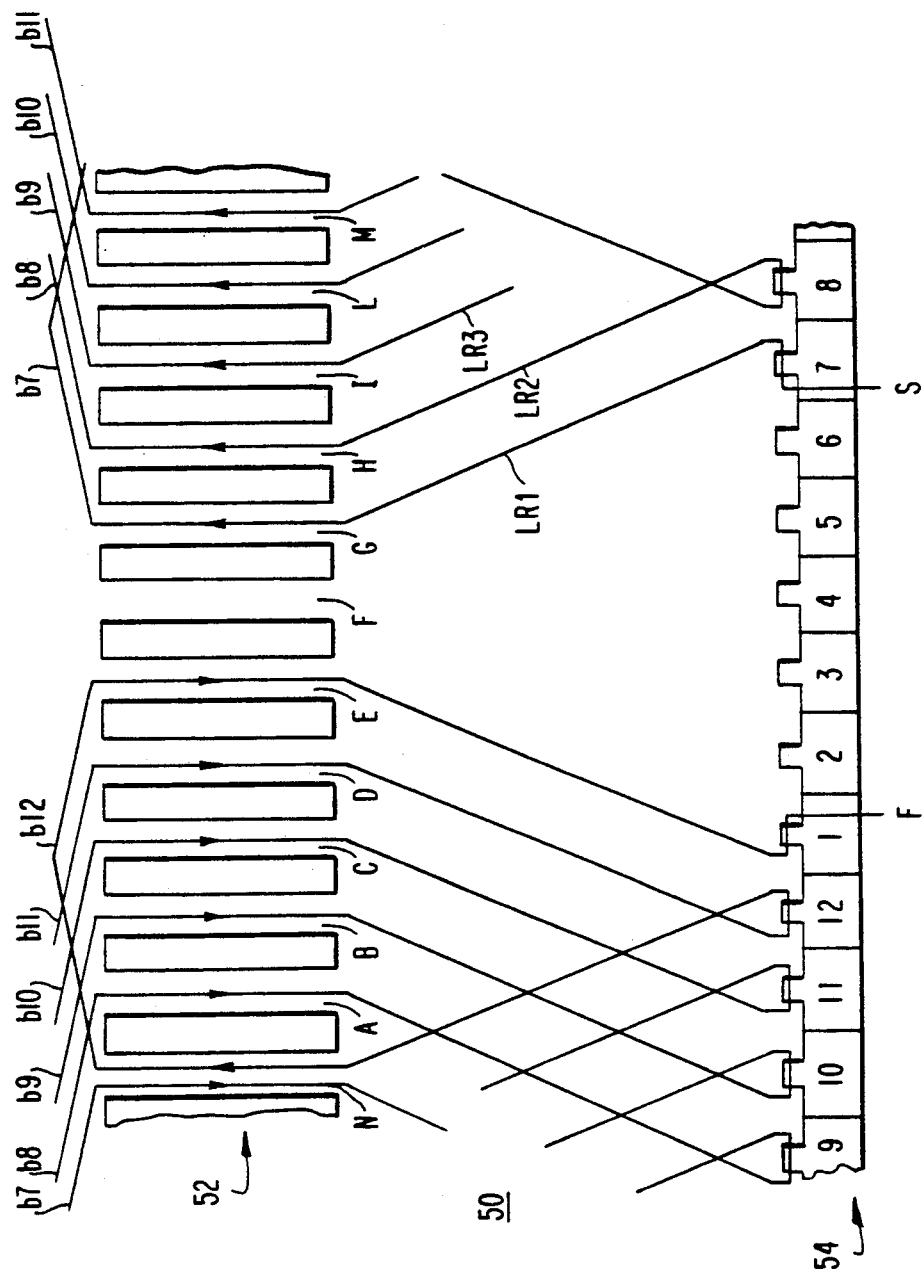
FIG. 2 is similar to FIG. 1 but shows another portion of the conventional side pattern winding of the same armature.
Figure 3:
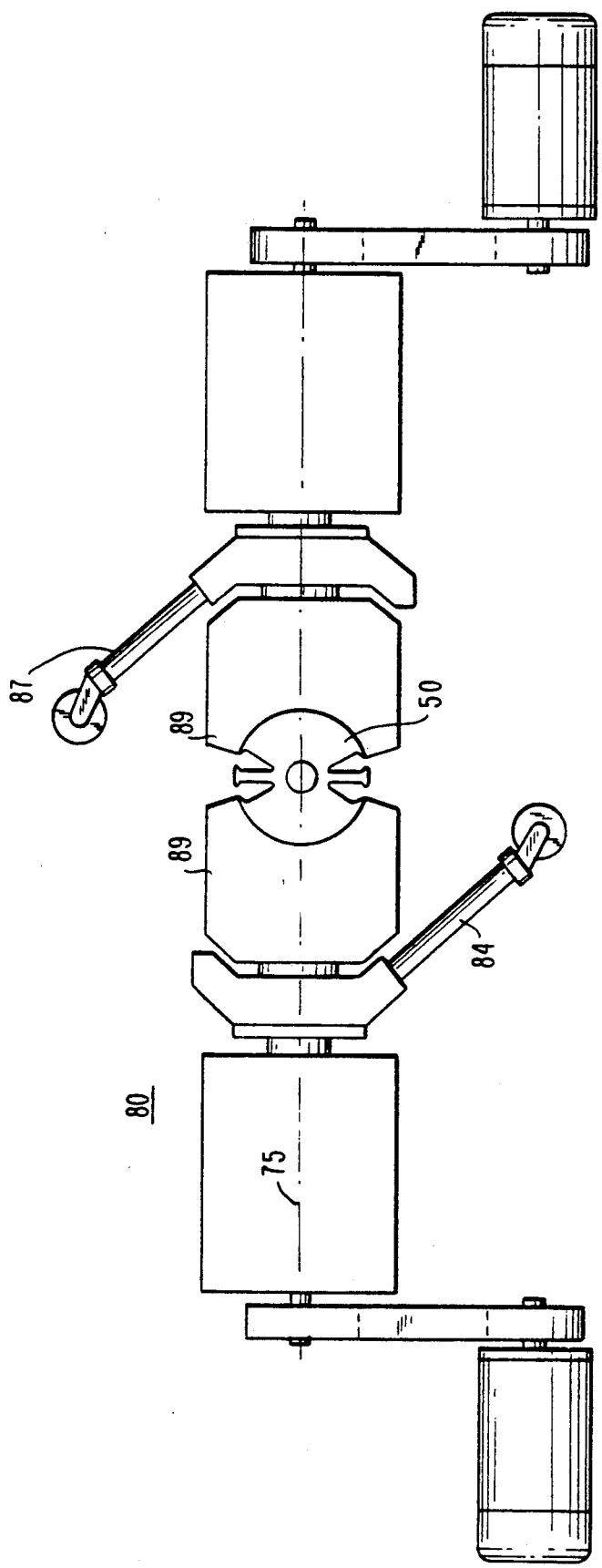
FIG. 3 is a simplified elevational view of a conventional two-flyer winder which can be used to wind armatures with either the conventional side pattern of FIGS. 1 and 2 or with the modified side pattern of this invention.
Figure 4:
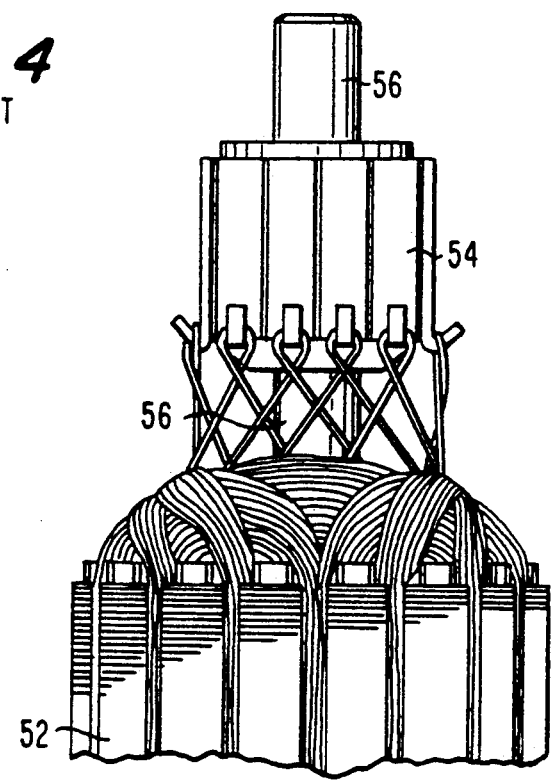
FIG. 4 is a side elevational view of a portion of an armature wound using the conventional side pattern.
Figure 8:
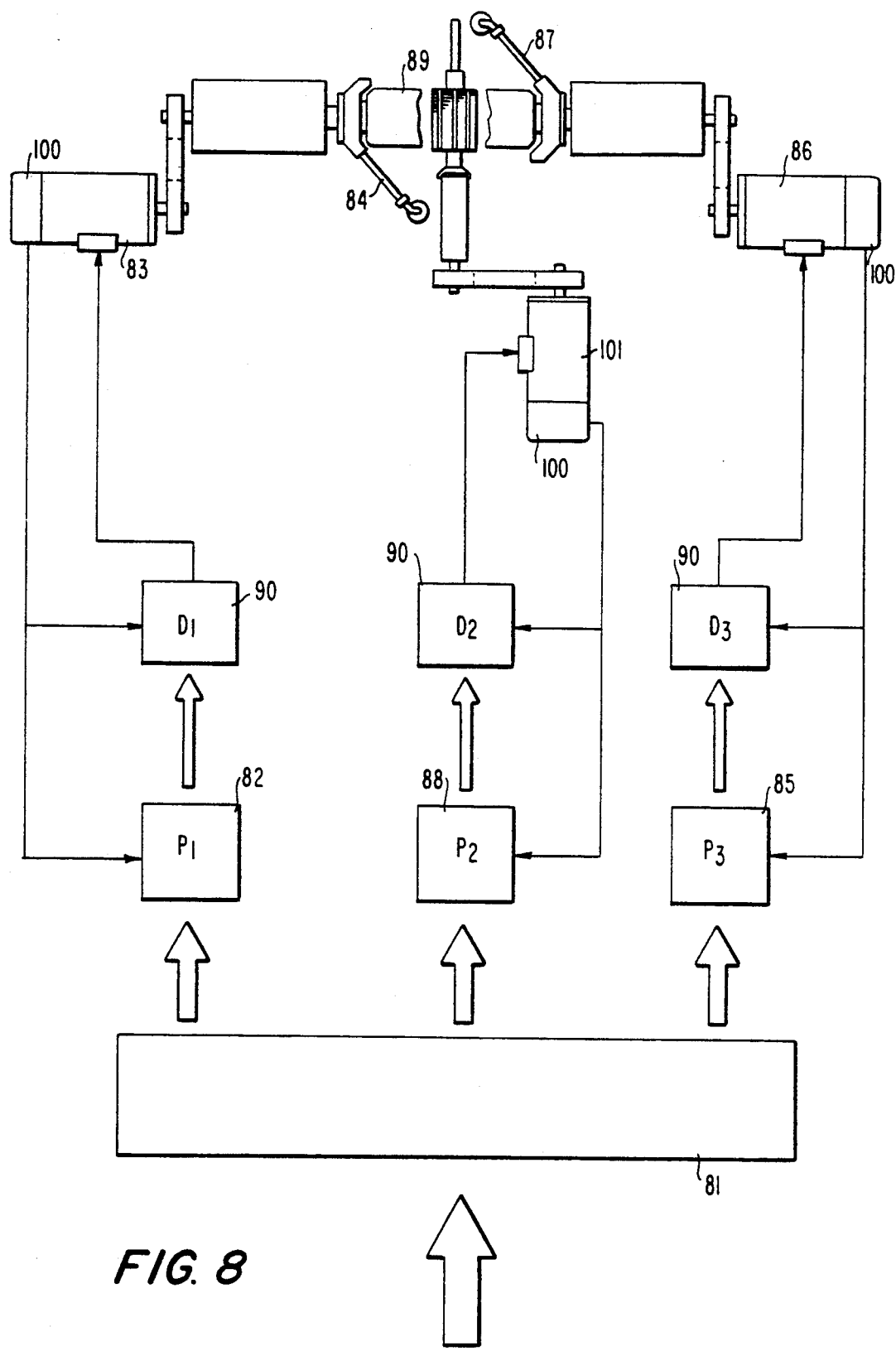
FIG. 8 is a simplified plan view of illustrative two-flyer winder apparatus with suitable control apparatus shown in block diagram form.

The winding pattern of the present invention can be obtained by means of a flyer winder shown in FIG. 3 having controls which are appropriately programmed and adequately equipped. For example, FIG. 8 shows controls for a suitable two-flyer winder. As shown in FIG. 8, computer 81 supplies position commands (i.e., signals indicating the position to be reached by the flyer) to position control cards 82 of motor 83 for driving flyer 84, and also to position control cards 85 of motor 86 for driving flyer 87. Computer 81 also supplies position commands to position control cards 88 of motor 101 for indexing the armature in order to position the core slots in relation to wire guides 89. Motor 101 also indexes the armature to position the commutator bars so that lead attachment to the same can be obtained by the flyer. Rotation of the armature by motor 101 also produces the desired lead routing between the commutator and the core slots.

From position control cards 82, 85, and 88, analog signals reach the respective drives 90 of the motors in order to command the speed performance together with their required starts and stops. For example, drives 90 control such motor parameters as the acceleration and deceleration ramps and the top speeds of motor 83, 86, and 101.

The motors are equipped with position sensors 100 to determine the actual position of the flyers during their movements and for determining the position of the armature while it is being indexed. This position information is supplied to the position control cards 82, 85, and 88 and to the drives 90 so that a closed retroactive control is achieved.

To produce the winding patterns shown in FIGS. 5 and 6, computer 81 is programmed to produce particular flyer commands and indexing sequences. Computer 81 may store this information for each type of armature which is to be processed. Illustrative information which may be supplied to computer 81 in order to enable it to calculate the angular position required for indexing the armature to produce a particular winding pattern includes:

N1—number of core slots;
N2—winding pitch;
N3—number of coils per slot to be wound by each flyer;
Theta 1—angle (or other form of position information) and direction from a zero position of the armature (loading position of the unwound armature) to the first commutator connection where the flyer wire is initially connected (e.g., bars 1 and 7 in FIGS. 5 and 6);
Theta 2—angle and direction from the zero position to the slot of the first coil to be wound and to be reached with lead routing wrapped around the armature shaft; and
Theta 3—angle and direction for turning the armature corresponding to how many lead attachments must have outgoing leads wrapped around the armature shaft, and which also defines when direct lead routing should start.

Because more data may be required to specify the winding schemes of this invention than is required to specify simpler winding schemes, the memory of computer 81 may have to be enlarged as compared to the memory required for conventional winding schemes.

It will be understood that the foregoing is merely illustrative of the principles of this invention, and that various modifications can be made by those skilled in the art without departing from the scope and spirit of the invention. For example, although the invention has been illustrated in the context of the use of flyer-type winders, it will be understood that other types of winders (e.g., winders of the type shown in commonly assigned application Ser. No. 07/738,199, filed Jul. 30, 1991) can be used instead if desired.

The invention claimed is:

1. The method of winding coils of wire on an armature having a longitudinal shaft, a plurality of slots extending parallel to said shaft and opening radially out from said shaft, said slots being spaced from one another in the circumferential direction around said shaft, and a commutator spaced from said slots along said shaft, said commutator having a plurality of wire anchoring sites spaced from one another in the circumferential direction around said shaft, each of said coils having a main coil portion which is wrapped around a chord of said armature between two circumferentially spaced slots, a start lead which extends from one of said wire anchoring site to said main coil portion, and a finish lead which extends from said main coil portion to another of said wire anchoring sites, said method comprising the steps of:

winding a first plurality of said coils so that the start and finish leads of each of said first plurality of said coils are wrapped around said shaft to an extent sufficient to cause said start and finish leads of said first plurality of coils to contact said shaft; and winding a second plurality of said coils so that the start and finish leads of each of said second plurality of said coils extend between the associated main coil portion and the associated wire anchoring site without being wrapped around said shaft to such an extent that they contact said shaft.

2. The method defined in claim 1 wherein said winding steps comprise winding each of said coils so that both of the wire anchoring sites associated with the start and finish leads of said coil are on the same circumferential side of the armature as said chord of said armature around which the main coil portion of said coil is wound.

3. The method defined in claim 2 wherein said winding steps comprise winding each of said coils so that both of the wire anchoring sites associated with the start and finish leads of each coil are located within the circumferential segment of the armature between the two slots defining the chord around which the main coil portion of said coil is wound.

4. The method defined in claim 1 wherein two of said coils are wound simultaneously on diametrically opposite sides of said armature.

5. The method of winding coils of wire on an armature having a longitudinal shaft, a plurality of slots extending parallel to said shaft and opening radially out from said shaft, said slots being spaced from one another in the circumferential direction around said shaft, and a commutator spaced from said slots along said shaft, said commutator having a plurality of wire anchoring sites spaced from one another in the circumferential direction around said shaft, said method comprising the steps of:

engaging a wire with a first wire anchoring site;

wrapping said wire extending from said first wire anchoring site at least partly around said shaft so that said wire contacts said shaft;

wrapping said wire extending from said first wire anchoring wire and from contact with said shaft around a first chord of said armature between two circumferentially spaced slots to form a first coil on said armature;

wrapping said wire extending from said first coil at least partly around said shaft so that said wire again contacts said shaft;

engaging said wire extending from said first coil and from contact with said shaft with a second wire anchoring site;

forming at least one additional coil on said armature by repeating with different ones of said wire anchoring sites the preceding steps with respect to the wire extending from said second wire anchoring site, a finish lead of the last of said additional coils extending to a first further wire anchoring site;

engaging said wire extending from said last additional coil with said first further wire anchoring site;

drawing said wire extending from said first further wire anchoring site back to a slot without wrapping said wire around said shaft to such an extent that said wire contacts said shaft;

wrapping said wire extending from said first further wire anchoring site around a further chord of said armature between two circumferentially spaced slots to form a further coil on said armature;

drawing said wire extending from said further coil to a second further wire anchoring site without wrapping said wire around said shaft to such an extent that said wire contacts said shaft; and engaging said wire extending from said further coil with said second further wire anchoring site.

6. The method defined in claim 5 wherein said engaging, wrapping, forming, and drawing steps are performed in such a manner that both of the wire anchoring sites associated with the start and finish leads of each of said coils are on the same circumferential side of said armature as said chord of said armature around which said coil is wound.

7. The method defined in claim 6 wherein said engaging, wrapping, forming, and drawing steps are performed in such a manner that both of the wire anchoring sites associated with the start and finish leads of each of said coils are located within the circumferential segment of the armature between the two slots defining the chord around which said coil is wound.

* * * * *

UNITED STATES PATENT AND TRADEMARK OFFICE
CERTIFICATE OF CORRECTION

PATENT NO. : 5,267,699

DATED : December 7, 1993

INVENTOR(S) : Massimo Lonbardi

It is certified that error appears in the above-identified patent and that said Letters Patent is hereby corrected as shown below:

On The Title Page, item [19] "Lombarbi" should read --Lombardi--;
and in item [75] "Massimo Lombarbi" should read --Massimo Lombardi--.

Signed and Sealed this

Twenty-first Day of June, 1994

*Attest:*

BRUCE LEHMAN

*Attesting Officer*  *Commissioner of Patents and Trademarks*